Jan. 15, 1963  R. F. BROYHILL  3,073,530
ADJUSTABLE SPRAYER BOOM
Filed Aug. 2, 1961
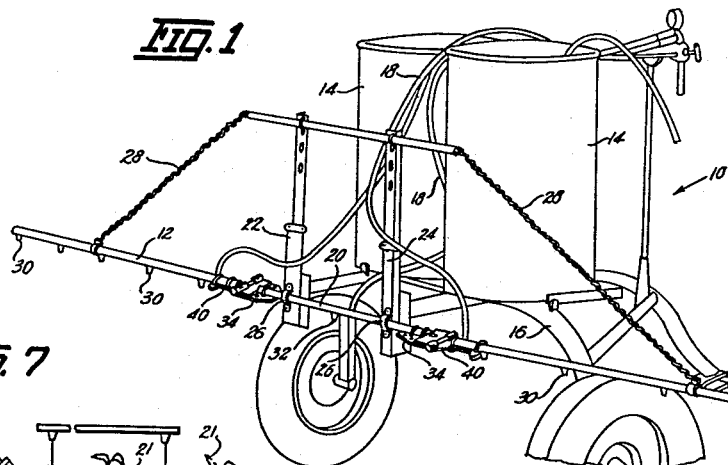
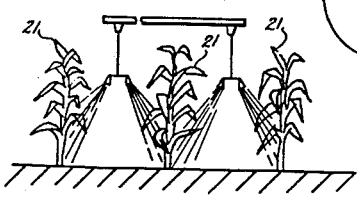
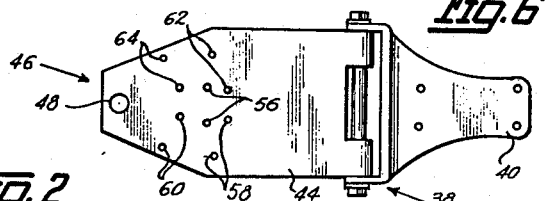
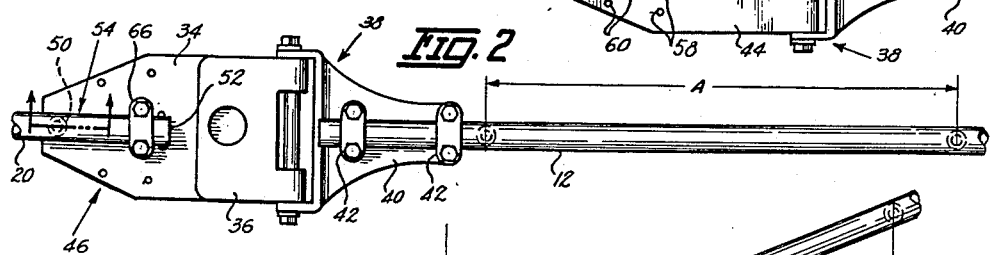
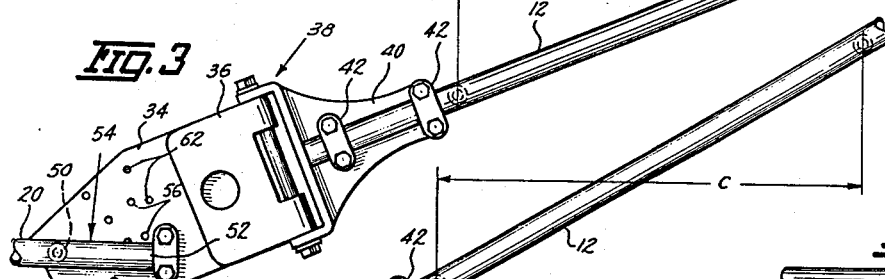
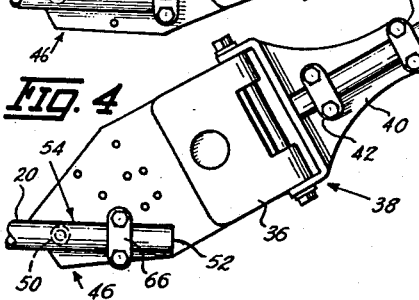
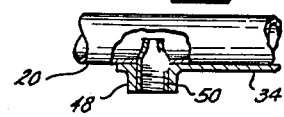
INVENTOR.
ROY F. BROYHILL
BY *Morton S. Adler*
ATTORNEY.

United States Patent Office 3,073,530
Patented Jan. 15, 1963

3,073,530
ADJUSTABLE SPRAYER BOOM
Roy F. Broyhill, Dakota City, Nebr.
Filed Aug. 2, 1961, Ser. No. 128,785
8 Claims. (Cl. 239—168)

This invention relates to spraying booms and more particularly to such booms as are used on equipment for spraying agricultural chemicals.

The use of spraying equipment on row crops is a well known expedient and generally spray nozzles are mounted on the booms at fixed spacings so that spraying can be accomplished not only directly on the crop rows but intermediate the rows as may be desired. Thus a twenty inch spacing of nozzles, which is commonly used, performs quite satisfactorily in areas where crop rows are on a forty inch spacing. However in some situations where because of the nature of the crop, a desire for greater yield from a given acreage, or for any other reason a spacing less than the common forty inches is used, it will be apparent that the more or less standard twenty inch spaced nozzles become progressively less accurate in relation to the legnth of the boom since each succeeding nozzle from a center point will be farther from its intended target.

Various means have been employed to adapt the sprayer unit to a variety of row spacings but generally these include the use of additional equipment such as booms with different nozzle spacing, off center nozzle extension units and the like which have not proved altogether satisfactory since, amongst other reasons, they increase the cost of equipment necessary where a variety of row spacings may be encountered.

Accordingly it is the principal object of this invention to provide a single sprayer boom with a plurality of nozzles at fixed spacings that may be quickly and easily adjusted to deliver streams of spray at different lateral spacings relative to a given line of travel.

More particularly this invention contemplates the use of an elongated boom with fixed nozzle spacings and including means at the inner end of the boom to pivotally attached it to a support complemented by means to selectively anchor the major boom length at selective variable angles relative to the direction of travel.

Another object herein is the provision of a boom support which may be used at either the right or left side of center of a sprayer trailer and be susceptible in either position of permitting the boom adjustment as indicated.

To attain these objects and such further objects as may appear herein, or be hereinafter pointed out, I make reference to the accompanying drawings forming a part hereof, in which:

FIG. 1 is a perspective view of a sprayer trailer showing my boom structure mounted thereon, FIGS. 2–4 are respective enlarged top plan views of the boom and boom support showing different positions of the boom relative to a given line of travel, and shown in a preferred embodiment with my multiple plate sprayer hinge assembly which is disclosed in my United States Patent 2,728,594, FIG. 5 is a cross sectional view taken on the line 5—5 of FIG. 2, FIG. 6 is a plan view illustrating the use of a single plate or supporting member in place of the multiple hinge plate of FIGS. 2–4, and FIG. 7 is a reduced schematic view illustrating the relative position of parallel crop rows to the boom sections in FIGS. 2–4.

Referring to the drawings a sprayer trailer unit is designated generally by the numeral 10 to illustrate one form of a mounting for the movable spray booms 12. Unit 10 as shown includes the tanks 14 carried by a wheeled frame or chassis 16 with hose lines 18 from tanks 14 to the booms 12 and will generally be attached to a tractor or the like (not shown) for movement over the crops to be sprayed. It will also be appreciated that the tanks, hoses and booms may be mounted on a self propelled vehicle but the particular form of mounting is immaterial to the instant invention.

The boom assembly includes in addition to the movable boom members 12, a fixed spray tubular center section 20 which, whether trailer mounted or otherwise, is disposed to extend perpendicularly to the direction of parallel crop rows 21 over which it is moved. As shown in FIG. 1, the center spray tube section 20 is secured to spaced upright frame or post members 22 and 24 on chassis 16 by any suitable means such as the U bolts 26. The boom members 12 are mounted as shown to the respective ends of section 20 and normally in axial alignment therewith. Chains 28 from a cross bar attached to posts 22 and 24 are secured to each boom section 12 for support in a well known manner. Boom units 12 are provided with a plurality of longitudinally spaced nozzles at fixed spacings preferably of twenty inches although such fixed spacings may be varied without departing from the invention hereinafter disclosed. Likewise, the fixed section 20 has the centrally located nozzle 32 so that section 20 and the attached sections 12 are in effect a single elongated unit for spraying purposes with fixed nozzle spacings. The general sprayer arrangement so far described is well known and is set forth here to indicate the environment in which this invention is used.

While the manner of attaching boom members 12 to the fixed center section 20 in accordance with this invention may take different forms, I have for purposes of illustration shown my improved multiple plate sprayer hinge assembly (Patent 2,728,594) in utilizing the present invention since that is the actual form in which it has been embodied, but it will be appreciated from the description which follows that such multiple plate hinge assembly while desirable, is not necessary to the use of this invention. In such patent, plates 34 and 36 are adapted to support the respective members 20 and 12 (though in a different form than shown here) and such plates are also laterally pivotable in opposite directions respectively relative to each other in a manner that is not material here. Member 12 is also vertically movable relative to plate 36 by the pin hinge assembly 38 and while this is a common expedient in sprayer units and is desirable, it is not required for the operation of this invention.

Coming now to the principal aspects of this invention the hinge assembly 38 on plate 36 includes a projecting integral arm 40 to which the inner end of a boom section 12 is removably secured by means of the U bolts 42, and plate 34, where the invention resides, is designed for adjustable mounting to one end of the center sprayer section 20. In this respect, as indicated above, plates 34 and 36 may be a single member as shown at 44 in FIG. 6 and therefore whenever plate 34 is referred to, it will be followed by the numeral (44) to indicate the like association to this invention.

The inner end 46 of plate 34 (44) is provided with a socket 48 (FIG. 5) for pivotally receiving a stud or boss 50 formed on or integral with section 20 and spaced inwardly from the outer end 52 thereof. In this way portion 54 of boom 12 which is intermediate stud 50 and end 52 is in juxtaposition with the top surface of plate 34 (44). A plurality of pairs of holes 56, 58, 60, 62 and 64 in a predetermined arrangement are provided in plate 34 (44) as shown in FIG. 6 and each respective pair is designed for selectively receiving a U bolt 66 to secure portion 54 of section 20 to plate 34 (44) in a predetermined relative position. For example when holes 56 are used as shown in FIG. 2, boom 12 is in axial alignment with the center section 20 and will be perpendicular to the direction 21 of the crop rows over which it will move. Thus, with a spacing of twenty inches for nozzles 30, the lateral spacing of the spray streams from such nozzles will be twenty inches. By pivoting plate 34 (44) about stud 50 so that bolt 66 can be employed in holes 58 (FIG. 3), the position of boom 12 is now angular both in relation to the center section 20 and the direction of travel over rows 21. It will thus be appreciated that by moving boom 12 in an arc with end 46 of plate 34 (44) pivotally fixed, the lateral spacings of streams from nozzles 30 relative to movement of boom 12 longitudinally of line 21 is progressively smaller according to the amount of angular adjustment of boom 12 as indicated by the lengths of lines A, B and C in FIGS. 2–4 respectively. The use of holes 60 (FIG. 4) increases the angular adjustment of boom 12 as described.

In actual practice, I have placed holes 58 to obtain a nineteen inch spacing of spray relative to line 21 and holes 60 provide for an eighteen inch interval. Such spacing is of course arbitrary and may be varied as the circumstances may require.

Holes 62 and 64 are provided so that plate 34 (44) can be used interchangeably at either end of the center section 20, and if interchanged, holes 62 and 64 will provide the boom 12 position corresponding to that of holes 58 and 60 respectively. Holes 56 are, of course, used as in FIG. 1 for the full preset spacing at either end of section 20.

From the above description it will be appreciated that a single spray unit equipped with booms 12 and having fixed spacing for nozzles 30 may now be used for efficient spraying over a wide variety of crop row intervals. The initial maximum spacing (FIG. 2) determined by the original fixed nozzle spacing can be progressively lessened by the movement of boom 12 from a position perpendicular to line 21 to any position short of parallel therewith and the exact intermediate positions of boom 12 can be a matter of choice as indicated to serve particular needs.

It is submitted that the invention shown and described is aptly suited to achieve the purposes intended and is characterized by a combination of highly useful and mutually cooperating elements that combine their respective and proportionate functions in accomplishing the objects sought to be obtained.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalent which may be reasonably included within their scope.

I claim:

1. In a sprayer boom assembly having a fixed elongated spray section adapted for movement perpendicularly of parallel lines of rows of crops, an elongated spray boom, and a plurality of nozzles at fixed predetermined spacings arranged longitudinally of said spray boom, the combination therewith of an improved hinge assembly connecting said spray section and spray boom, said hinge assembly comprising a plate member, means removably securing one end of said spray boom to said plate member, means pivotally securing said plate member to one end of said spray section for lateral movement relative thereto, said plate member being provided with a plurality of pairs of holes at predetermined locations, and fastening means selectively attachable to said plate member through respective pairs of holes to secure said plate member to said spray section at predetermined relative positions whereby said spray boom is selectively disposed in axial alignment to said spray section or off-set from axial alignment therewith at predetermined positions.

2. In a sprayer boom assembly having a fixed elongated spray section adapted for movement perpendicularly of parallel lines of rows of crops, an elongated spray boom, and a plurality of nozzles at fixed predetermined spacings arranged longitudinally of said spray boom, the combination therewith of an improved hinge assembly connecting said spray section and spray boom, said hinge assembly comprising a stud on one end portion of said spray section spaced inwardly from the adjacent spray section end, a plate member having a first and second end respectively, said first end provided with means for pivotally receiving said stud whereby the end portion of said spray section outwardly from said stud is in juxtaposition to said plate member, means for removably securing one end of said spray boom to said second end of said plate member, said plate member over which said spray section end portion is in juxtaposition being provided with a plurality of pairs of holes at predetermined locations, and fastening means selectively attachable to said plate member through respective pairs of holes to secure said plate member to said spray section at predetermined relative positions whereby said spray boom is selectively disposed in axial alignment to said spray section or off-set from axial alignment therewith at predetermined positions.

3. In a sprayer boom assembly having a fixed elongated spray section adapted for movement perpendicularly of parallel lines of rows of crops, an elongated spray boom, and a plurality of nozzles at fixed predetermined spacings arranged longitudinally of said spray boom, the combination therewith of an improved hinge assembly connecting said spray section and spray boom, said hinge assembly comprising a stud on one end portion of said spray section spaced inwardly from the adjacent spray section end, a plate member having an integral arm, said plate member provided with means for pivotally receiving said stud whereby the end portion of said spray section outwardly from said stud is in juxtaposition to said plate member, means for removably securing one end of said spray boom to said arm, said plate member over which said spray section end portion is in juxtaposition being provided with a plurality of pairs of holes at predetermined locations, and fastening means selectively attachable to said plate member through respective pairs of holes to secure said plate member to said spray section at predetermined relative positions whereby said spray boom is selectively disposed in axial alignment to said spray section or off-set from axial alignment therewith at predetermined positions.

4. In a sprayer boom assembly having a fixed elongated spray section adapted for movement perpendicularly of parallel lines of rows of crops, an elongated spray boom, and a plurality of nozzles at fixed predetermined spacings arranged longitudinally of said spray boom, the combination therewith of an improved hinge assembly connecting said spray section and spray boom, said hinge assembly comprising a plate member, means removably securing one end of said spray boom to said plate member, means pivotally securing said plate member to one end of said spray section for lateral movement relative thereto, and fastening means selectively attachable to said plate member in different relative positions to secure said plate member to said spray section at predetermined relative positions whereby said spray boom is selectively disposed in axial alignment to said spray section or off-set from axial alignment therewith at predetermined positions.

5. In a sprayer boom assembly having a fixed elongated spray section adapted for movement perpendicularly of parallel lines of rows of crops, an elongated spray boom, and a plurality of nozzles at fixed predetermined spacings arranged longitudinally of said spray boom, the combination therewith of an improved hinge assembly connecting said spray section and spray boom, said hinge assembly comprising a stud on one end portion of said spray section spaced inwardly from the adjacent spray section end, a plate member having a first and second end portion respectively, said first end portion provided with means for pivotally receiving said stud whereby the end portion of said spray section outwardly from said stud is in juxtaposition to said plate member, means for removably securing one end of said spray boom to said second end portion of said plate member, and fastening means selectively attachable to the first end portion of said plate member in different relative positions to secure said plate member to said spray section at predetermined relative positions whereby said spray boom is selectively disposed in axial alignment to said spray section or off-set from axial alignment therewith at predetermined positions.

6. In combination with a sprayer boom assembly having a fixed elongated spray section and an elongated spray boom having a plurality of nozzles at fixed predetermined spacings arranged longitudinally thereon, a sprayer boom hinge assembly having a first and second end respectively, means removably securing one end of said spray boom to said first end of said hinge assembly, a stud on said spray section near one end thereof, socket means on said second end of said hinge assembly to pivotally receive said stud and afford lateral movement of said hinge assembly relative to said spray section, and selective means on said hinge assembly to secure said second end to said spray section intermediate said stud and the near end of said spray section to hold said hinge assembly against lateral movement relative to said spray section in selective positions of predetermined alignment.

7. In combination with a sprayer boom assembly having a fixed elongated spray section and an elongated spray boom having a plurality of nozzles at fixed predetermined spacings arranged longitudinally thereon, a sprayer boom hinge assembly including a plate member and a support arm, means removably securing one end of said spray boom to said support arm, means pivotally attaching said plate member to one end of said spray section for lateral movement relative thereto, and selective means on said plate member attachable to said spray section in selective positions of alignment for rendering ineffective the pivotal connection between said plate member and said spray section and thereby fixedly dispose said spray boom either in axial alignment with said spray section or angularly relative thereto.

8. In combination with a sprayer boom assembly having a fixed elongated spray section and an elongated spray boom, a hinge plate member, means removably securing one end of said spray boom to said plate member, means pivotally securing said plate member to one end of said spray section for lateral movement relative thereto, and selective means on said plate member attachable to said spray section in selective positions of alignment for rendering ineffective the pivotal connection between said plate member and said spray section and thereby fixedly dispose said spray boom either in axial alignment with said spray section or angularly relative thereto.

References Cited in the file of this patent

UNITED STATES PATENTS

| | | |
|---|---|---|
| Re. 11,736 | Twining | Apr. 25, 1899 |
| 2,539,288 | Van Horn | Jan. 23, 1951 |
| 2,728,594 | Broyhill | Dec. 27, 1955 |